United States Patent [19]
Ervin, Jr.

[11] 3,973,552
[45] Aug. 10, 1976

[54] METHOD OF STORING AND RELEASING THERMAL ENERGY

[75] Inventor: Guy Ervin, Jr., Northridge, Calif.

[73] Assignee: Rockwell International Corporation, El Segundo, Calif.

[22] Filed: June 23, 1975

[21] Appl. No.: 589,733

[52] U.S. Cl. .................................. 126/271; 165/1; 126/263; 126/400
[51] Int. Cl.² ......................................... F24J 3/02
[58] Field of Search ........... 126/270, 271, 263, 400; 165/1, 2

[56] References Cited
UNITED STATES PATENTS

| | | | |
|---|---|---|---|
| 2,808,494 | 10/1957 | Telkes | 126/400 X |
| 2,856,506 | 10/1958 | Telkes | 126/400 X |
| 3,642,059 | 2/1972 | Greiner | 165/1 X |

FOREIGN PATENTS OR APPLICATIONS

| | | | |
|---|---|---|---|
| 1,176,174 | 11/1958 | France | 126/271 |

*Primary Examiner*—Kenneth W. Sprague
*Attorney, Agent, or Firm*—L. Lee Humphries; Henry Kolin; Clark E. DeLarvin

[57] ABSTRACT

A cyclic method of storing and recovering thermal energy utilizing a particulate bed of a decomposable heat storage material selected from the group consisting of the hydroxides of magnesium, calcium, and barium. The bed of heat storage material is confined within a container adjacent a water-permeable wall of the container. Thermal energy of chemical decomposition is stored by heating the bed of selected hydroxide to a temperature within the range of from 300° to 900°C and above the decomposition temperature of the selected hydroxide for a time sufficient to decompose at least a part of the selected hydroxide to form the corresponding oxide and water vapor. The water vapor is withdrawn by passing a carrier gas into contact with the water-permeable wall of the container to absorb the water vapor permeating therethrough. The stored thermal energy is recovered by passing a water-laden carrier gas into contact with the water-permeable wall, whereby the water vapor permeates through the wall into contact with the oxide to reform the selected hydroxide and generate heat of reaction which is removed by the carrier gas.

10 Claims, 2 Drawing Figures

3,973,552

METHOD OF STORING AND RELEASING THERMAL ENERGY

BACKGROUND OF THE INVENTION

1. Field of the Invention

The invention relates generally to a method of storing and releasing heat utilizing a decomposable heat storage material. More particularly, it is directed to a method of utilizing solar energy.

2. Prior Art

Heat storage is known, and various methods have been suggested heretofore for such storage. It has been suggested, for example, that a solid or liquid material be heated to a high temperature and the sensible heat content of the material thereafter used when required. Suggested materials include gravel, rocks and water. The heat storage capability of such materials is relatively low. Thus, such processes are basically impractical in that they require a large bulk to provide storage capacity for significant quantities of heat. More recently, systems have been proposed wherein the heat of solution or heat of fusion is utilized. For patents relating to use of the heat of solution of hydrates, see U.S. Pat. Nos. 2,677,664, 2,706,716 and 2,827,438. For patents relating to use of the heat of fusion for storing thermal energy see U.S. Pat. Nos. 2,677,243, 2,856,506 and 3,320,408.

In U.S. Pat. No. 2,808,494 there is suggested a heat storage method which utilizes as the heat storage medium an anhydrous crystalline solid which is dimorphic, i.e., changes from one anhydrous crystalline form to another on the application of heat. Patentee discloses that the heat storage material is capable of storing as much as 180 Btu/lb. Obviously, however, a substantial quantity of such material still would be required to store a large amount of thermal energy.

In a book entitled *Direct Use of the Sun's Energy* by Farrington Daniels, New Haven and London, Yale University Press, 1964, and references cited therein, there is compiled a discussion of the various methods proposed for collecting and storing solar energy. Numerous methods of storing and recovering thermal energy are suggested, such as the hydration of various oxides and chlorides, including the oxides of calcium and magnesium. The book, while broadly suggesting that such materials might be used, offers very little specific guidance as to any method by which such materials might be effectively utilized in the storage of thermal energy.

In U.S. Pat. No. 3,642,059, there is disclosed a compact heating and cooling apparatus. The apparatus comprises two vessels connected by a conduit, the first containing a vaporizing liquid (water), and the second containing a vapor-absorptive chemical ($Na_2O$). The liquid evaporates from the first vessel and its vapors are drawn by the vapor-absorptive chemical through the conduit to the second vessel where they are absorbed and condensed with the subsequent cooling of the first vessel through heat of vaporization and heating of the second vessel through heat of vapor absorption. Other vapor-absorptive materials disclosed in the patent include lithium monoxide, calcium monoxide, calcium chloride, phosphorus pentoxide, and sodium hydroxide. Patentee's apparatus is intended for use in remote isolated areas devoid of electricity or other conventional forms of energy, and he teaches that a low temperature, i.e., below about 120°C must be maintained in the two vessels for effective operation. Such apparatus is of limited utility.

There still is a need for an effective cyclic method of storing and recovering substantial quantities of thermal energy for heating large areas such as office buildings, or homes, to generate steam for load leveling in the utility industries and the like.

SUMMARY OF THE INVENTION

The invention provides a method of storing heat for extended periods for subsequent release and use. Thus, where electrical energy, for example, is used as a source of heat, the present invention provides a means by which such energy can be converted during off-peak hours and stored for later recovery as thermal energy. Alternatively, where there is an intermittent primary source of thermal energy such as solar energy, the invention provides a means by which it can be collected and stored during the daylight hours for subsequent recovery and use at night.

The present invention provides a cyclic method of storing and recovering substantial quantities of thermal energy in a relatively small space. The present method may be practiced utilizing only two interconnected vessels. In the preferred mode, however, the invention comprises a closed loop cyclic method of storing and recovering thermal energy.

Broadly, the cyclic method of the present invention comprises providing a particulate bed of a decomposable heat storage material confined within a container having at least one water-permeable wall for the passage of water vapor therethrough. The bed is disposed adjacent the water-permeable wall. The decomposable heat storage material is selected from the group consisting of the hydroxides of magnesium, calcium, and barium; said bed of materials having an apparent density of from 25% to 75% of that of the selected heat storage material. The bed of heat storage material should have a depth when measured perpendicular to the permeable wall of less than about 40 cm.

To obtain the maximum benefits from the present method there are certain essential parameters which must be observed. Specifically, it has been found that the bed of heat storage material must have an apparent density of from 25% to 75% of the density of the selected material. When the apparent density of the bed of material exceeds the foregoing upper limit, it is difficult, if not impossible, to effect complete conversion of all the material. Apparent densities below those specified result in unnecessary waste of space, thus defeating a principal advantage of the present invention, i.e., compact storage of substantial quantities of thermal energy.

The heat storage material also should be arranged to have a depth of less than about 40 cm, and preferably a depth of from about 1 to 30 cm. It has been found that if the thickness or depth of the bed is in excess of 40 cm, it is difficult to effect a complete conversion of substantially all of the material from the oxide to hydroxide, or hydroxide to oxide within a reasonable time period, i.e., 8–12 hours.

Thermal energy is stored by heating the bed of selected hydroxide to a temperature within the range of from about 300° to 900°C and above the decomposition temperature of the selected hydroxide for a time sufficient to effect an endothermic chemical decomposition of at least a part of the selected hydroxide to form the corresponding oxide and water vapor. The water vapor is removed by passing a carrier gas into contact with the water permeable wall of the container to absorb the water vapor permeating there-through. The thermal energy is released and recovered by passing a water vapor-laden carrier gas into contact with the water-permeable wall, whereby the water vapor permeates through the wall into contact with the oxide to effect an exothermic chemical reaction to reform the selected hydroxide and generate heat which is removed by the carrier gas.

In accordance with a particularly preferred embodiment of the invention, the container is an elongated tube-shaped member containing the heat storage material and is heated, utilizing concentrated solar energy, for example, by locating the heat storage material in the focal zone of a focusing solar energy collector. Solar energy is collected to convert the selected hydroxide to the corresponding oxide. In accordance with another embodiment of the invention, the heat storage material is located between two substantially planar water permeable members, and the carrier gas passes through both water-permeable members and the bed of heat storage material. Advantageously, in such latter embodiment the bed of heat storage material is fluidized by the flow of carrier gas to facilitate the conversion of the material from one form to the other.

One advantage of the method of the present invention is that a substantially higher heat storage capacity is obtained with the selected hydroxides than were obtainable with many of the suggested prior art processes. Specifically, using steam or water vapor, the heat of hydration for magnesium oxide, calcium oxide, and barium oxide at room temperature are 873 Btu/lb (19.4 kcal/mole), 880 Btu/lb (27.4 kcal/mole), and 410 Btu/lb (34.9 kcal/mole), respectively. Another advantage of the present method is that the heat stored may be retained indefinitely without any external supply of energy required or expensive insulation, since the thermal energy is stored as a chemical bond and not as sensible heat. These and many other advantages will be apparent to those versed in the art upon reference to the following table.

TABLE

COMPARISON OF HEAT STORAGE METHODS BASED ON STORAGE OF $10^6$ BTU

| Method | Material | Weight (lb.) | Material Volume (cu. ft.) | Material Cost (dollars) |
|---|---|---|---|---|
| Sensible Heat* | Water | 20,000 | 320 | 0–2 |
| Sensible Heat* | Rock | 100,000 | 720 | 80 |
| Heat of Fusion | $Na_2SO_4 \cdot 10H_2O$ | 10,000 | 109 | 100 |
| Chemical Reaction | $Mg(OH)_2/MgO$ | 3,200 | 22 | 225 |
| Chemical Reaction | $Ca(OH)_2/CaO$ | 2,300 | 16 | 24 |
| Chemical Reaction | $Ba(OH)_2/BaO$ | 3,900 | 13 | 1,250 |

*Based upon a 50°F temperature range

It will be noted that in the foregoing table the amounts of Mg, Ca and Ba required for the storage of one million Btu are higher than would seem necessary in view of the aforementioned heats of hydration. This difference is the result of heat required for the vaporization of liquid water. Thus, if water vapor were used to hydrate the rejected oxides, the weight and volume of material would be substantially reduced. Nonetheless, even using liquid water, it is seen that the selected materials provide a substantial improvement over the prior art materials. The specific material selected for use will depend upon the design criteria of paramount importance. When the most important factor is being able to effect the hydroxide-oxide transformation at as low a temperature as possible, the magnesium compound is preferred. Barium may be preferred in spite of its high cost when the principal criterion is to use a minimum volume of material or to obtain as high a temperature as possible during the hydration transformation. Calcium is generally preferred, since it has a moderately high hydration temperature, is low in cost, and has a high heat storage capacity per unit weight and volume. In addition, the rate of transformation of calcium from hydroxide to oxide or vice versa is more rapid than for magnesium.

In accordance with the present invention, the heat storage material is contained within a housing having at least one water-permeable wall. The term "water-permeable wall" as used herein is defined as a wall made of a porous or pervious material which will permit the passage therethrough of a specific quantity of air in a unit time under certain specified conditions of area and pressure. The permeability is expressed in terms of air, for convenience, since that is the more acceptable standard for permeability. Specifically, the wall must have a permeability such that, at a temperature of 75°F and a pressure differential across the wall of one pound per square inch, the wall will permit the passage therethrough of from 1 to 200 standard cubic feet per minute (SCFM) of air per square inch of permeable wall area. Preferably, the selected material for the permeable wall member will permit the passage therethrough of from about 5 to 100 SCFM of air per square inch.

The selection of the material for the water-permeable member or wall is not critical, provided that the selected material is structurally capable of withstanding the elevated temperature necessary to effect conversion of the selected heat storage material. Examples of suitable materials include conventional metal filter materials such as steel wool, wire screens, wire cloth, metal felts and the like. Also usable are the ceramic materials such as mats of glass fibers, porous ceramic bodies and fritted glass or materials such as asbestos.

The storage of thermal energy is effected by heating the bed of selected hydroxide to a temperature of from about 300° to 900°C and above the thermal decomposition temperature of the selected hydroxide for a time sufficient to decompose a desired amount of the selected hydroxide. The exact temperature required will depend, among other things, upon the specific hydroxide selected. For example, in the case of calcium hydroxide, at atmospheric pressure a temperature of at least about 530°C is required to effect the conversion. Obviously, of course, the time, pressure and temperature are interrelated, with higher temperatures resulting in a more rapid conversion, i.e., requiring less time, while higher pressures necessitate higher temperatures to effect the decomposition of the hydroxide.

Generally, it has been found that at atmospheric pressure a temperature of from about 375° to 450°C is adequate for effecting the conversion of magnesium hydroxide to magnesium oxide or vice versa in a time of about 8 hours or less. When the selected material is calcium hydroxide, however, it generally is necessary to maintain a temperature of from about 510° to 600°C for a time of about 8 hours or less, while with barium hydroxide a temperature of from about 650° to 800°C and a time of about 8 hours or less is sufficient. The foregoing are all based upon atmospheric water vapor pressure; thus, effective conversion may be achieved at lower temperatures with lower pressure. For example, at 0.1 atmosphere water vapor pressure the magnesium hydroxide and calcium hydroxide are readily decomposable to their corresponding oxides at temperatures as low as about 300° and 475°C, respectively.

Preferably, the water vapor is introduced or removed from the heat storage material with an inert carrier gas. The selection of the specific gas is not critical, and practically any gaseous medium may be utilized, providing it is capable of carrying moisture. Examples of suitable gases include steam or non-condensible gases such as nitrogen, air, oxygen, and the like. Carbon dioxide should be avoided, however, since it will react with the heat storage material forming carbonates which are difficult to decompose. Obviously, when the carrier gas is being used to remove the water vapor formed in the decomposition of the selected hydroxide, the gas, when contacting the heat storage material, initially should be substantially dry. By substantially dry it is not meant that the gas be free of any water vapor. Rather the gas must not be saturated at the temperature maintained in the container, since if it were so saturated it would be incapable of removing and carrying away any further moisture.

When heat is being recovered from the heat storage material, the carrier gas should be substantially saturated with moisture, though it need not be completely saturated. In accordance with one preferred embodiment, the carrier gas is passed through a body of water to pick up moisture which is carried to the heat storage material. The carrier gas may be bubbled through a body of water, or, alternatively, it may be passed through a shower or fine mist of water. Various other equivalent means of providing a desired amount of water in the carrier gas will be readily apparent to those versed in the art.

The cyclic method of the present invention is a closed system, thus, it may be operated at atmospheric pressure as well as above or below atmospheric pressure. The selection of an operating pressure will depend upon, among other things, the desired temperature of operation. For example, magnesium hydroxide is readily decomposed to the oxide at a temperature of only 350°C at atmospheric pressure; however, a higher temperature is obtainable upon hydration of the oxide by increasing the pressure in the system. Thus, at 50 atmospheres pressure the magnesium oxide will react with water, generating heat at temperatures as high as 437°C. The calcium and barium oxides behave in a similar manner. It is seen, therefore, that the present invention provides a method by which it is possible to recover thermal energy at a higher temperature than that at which it was stored simply by increasing the pressure prior to hydration of the oxide.

BRIEF DESCRIPTION OF THE DRAWINGS

The invention will be more clearly understood by reference to the description below taken in connection with the accompanying drawing wherein.

DESCRIPTION OF THE PREFERRED EMBODIMENTS

The present invention provides a method of collecting and storing thermal energy for subsequent recovery and use. The following description of certain preferred embodiments is set forth for the purpose of illustration and should not be construed as limiting the scope of the invention.

Figure 1:
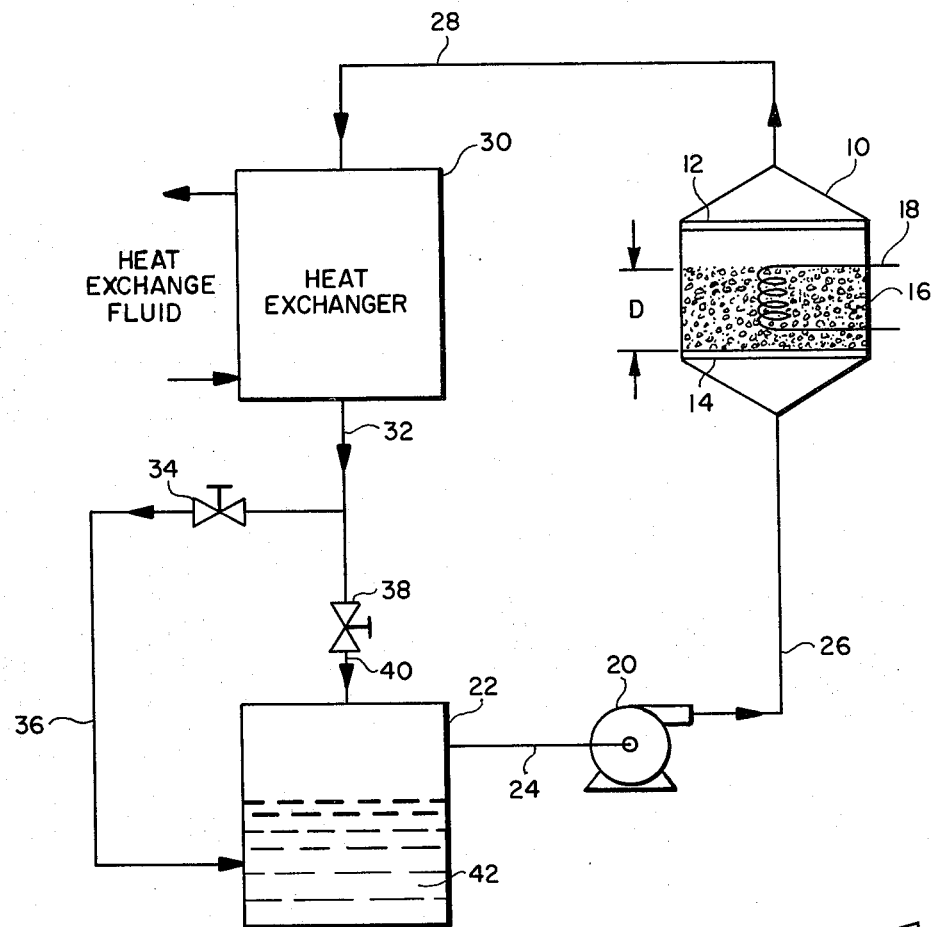
FIG. 1 is a schematic representation of an embodiment of the invention.

Referring now to FIG. 1 of the drawing, there is shown a preferred closed loop embodiment of the invention wherein a housing 10 contains two substantially planar water-permeable wall members 12 and 14 in spaced-apart relation. Located within a space defined by wall members 12 and 14 in housing 10 is a bed of a selected heat storage material 16. The bed of heat storage material 16 has a certain depth, when measured substantially perpendicular to wall member 14, designated by the letter D and must be less than about 40 cm as hereinbefore described. Alternatively, the heat storage material could be contained within a plurality of tubes having water permeable walls and located within housing 10 with means provided for the passage of a carrier gas about the outer surface of the tubes.

In the embodiment depicted, housing 10 is provided with a means for heating the heat storage material 16. For purpose of illustration there is shown an electrical resistance heater 18. A pump 20 supplies carrier gas from a reservoir 22 via conduits 24 and 26 to housing 10. A conduit 28 provides communication between housing 10 and a heat exchanger 30. Heat exchanger 30 is in communication with reservoir 22 via a conduit 32 and either through a valve 34 and a conduit 36 or through a valve 38 and a conduit 40, depending upon the mode of operation. Contained within reservoir 22 is, in addition to a supply of carrier gas, a body of water 42.

During the heat storage mode of operation, the heat storage material is initially in the hydroxide form, and heat is supplied thereto by heating element 18. The temperature of the material is raised sufficiently high (300° to 900°C) for a time sufficient to effect the thermal decomposition of the hydroxide to the oxide. During this time the carrier gas is withdrawn from reservoir 22 by pump 20 and passed through housing 10, the carrier gas passing through the water-permeable wall members 12 and 14 as well as through heat storage material 16. It will be appreciated that even if the carrier gas were saturated upon being withdrawn from the reservoir, in passing through the heated heat storage material the gas itself is heated, thus providing the capability of absorbing still more moisture.

The carrier gas picks up the moisture generated by the decomposition of heat storage material 16 and passes out of housing 10 via conduit 28 to heat exchanger 30. In heat exchanger 30 the moisture-laden carrier gas passes in indirect heat exchange relationship with a source of heat exchange fluid to cool the carrier gas and remove heat therefrom, the heat removed being carried off by the exchange fluid. The exact controls for regulating the amount of heat removed or the manner in which the removed heat is used is not shown, since these are well known to those skilled in the art and form no essential part of the present invention.

Upon cooling of the carrier gas, part of the moisture carried therein condenses and the mixture of condensed moisture and carrier gas leaves heat exchanger 30 through conduit 32, valve 38, and conduit 40, where they enter reservoir 22. The condensed moisture precipitates from the gas into the body of water contained within reservoir 22, the remainder of the gas then being recycled to remove additional moisture from heat storage material 16. When the desired amount of dehydration of the heat storage material has been accomplished, electrical resistance heater 18 is turned off and valve 38 is closed.

When it is desired to recover thermal energy from heat storage material 16, the operation is substantially the same as just described except that valve 38 is closed and valve 34 is opened, whereby the gas circulating through the system bubbles up through the body of water 42 in reservoir 22 to pick up moisture to hydrate the heat storage material and generate heat by the chemical reaction of converting the oxide to the hydroxide.

The embodiment depicted is operable as a fixed bed, and is particularly advantageous when it is desired to fluidize the bed of particulate heat storage material 16. When fluidization is desired it is essential that the material have a specified particle size and preferably that the bed have a certain apparent or bulk density. Specifically, to effectively fluidize the bed, the bed of material should have an apparent density within the range of from 30% to 60% of that of the selected material, and preferably an apparent density of from about 35% to 50%. The discrete particles of selected heat storage material should have a median particle size within the range of from about 0.5 to 200 microns and preferably a median size of from about 10 to 150 microns. In addition, to allow for expansion of the heat storage material during fluidization, the dimension D should not be more than about 40% to 50% of the total distance between the two water-permeable wall members 12 and 14.

It will be appreciated that while in the embodiment depicted in FIG. 1 the heat storage material is shown as being heated with an electrical resistance heater, that various other sources of heat would be equally applicable. Thus, heat could be supplied from other heat sources such as indirect heating by the combustion of conventional fuels such as coal and natural gas and fuel oils. In addition, rather than supplying the heat directly to the heat storage material as depicted, in some instances it might be advantageous to heat the carrier gas prior to its introduction into housing 10, and use the heated carrier gas to decompose the hydroxide form of heat storage material. Further, rather than using the carrier gas to recover heat from the heat storage material, it may be desirable in some instances to pass a heat exchange fluid (either liquid or gas) in indirect heat exchange relation with the heat storage material to recover the heat.

Figure 2:
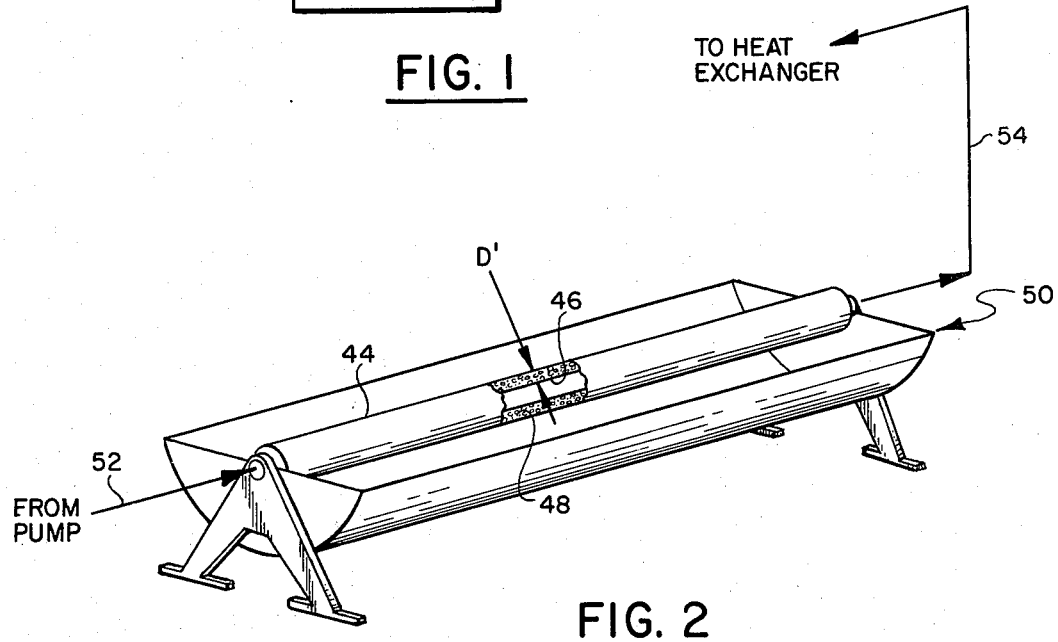
FIG. 2 is a schematic partially fragmented representation of another embodiment of the invention.

Referring to FIG. 2, there is shown an alternate embodiment of the invention wherein the heat for converting the heat storage material is solar energy. Specifically, a housing 44 is an elongated tube-shaped member having a substantially concentric, coaxial inner water-permeable wall member 46. Contained within the inner zone defined by the outer surface of housing 44 and water-permeable wall member 46 is a body of a selected heat storage material 48 having a depth D'. In this particularly preferred embodiment housing 44 is located within the focal zone of a parabolic trough solar energy collector 50, however, it will be appreciated that any other form of concentrating solar energy collector could be used. In operation the carrier gas from the pump passes through a conduit 52 and housing 44 and out through a conduit 54 to a heat exchanger in substantially the same manner as described with reference to FIG. 1, except that the carrier gas does not pass through the water-permeable member 46. In this embodiment the heat storage material is not fluidized by the carrier gas, thus, the bulk density is not as critical. In this particular embodiment the apparent density of the bed preferably is in the range of from 35% to 75% of that of the selected material.

The depth of the bed of heat storage material D' preferably is within the range of from 1 to 10 cm. While the median particle size is not critical in this embodiment, it generally is preferred to use material having a median particle size within the range of from about 0.5 to 1000 microns.

While there have been described various embodiments of the invention, the method described is not intended to limit the scope of the invention, as it is realized that changes therein are possible within the invention. It is further intended that each step recited in any of the following claims is to be understood as referring to all equivalent steps for accomplishing substantially the same results in substantially the same or equivalent manner. For example, while certain specific means for heating the heat storage material and certain preferred arrangements of the heat storage material have been explicitly disclosed, they are to be considered merely as exemplary since numerous other equivalents will be apparent to those skilled in the art.

What is claimed is:

1. A cyclic method of storing and recovering thermal energy comprising:

providing a container having at least one water-permeable wall for the passage of water vapor therethrough;

providing a particulate bed of a selected heat storage material in said container adjacent at least said one water-permeable wall, said heat storage material being selected from the group consisting of the hydroxides of magnesium, calcium, and barium, said bed of selected material having an apparent density of from 25% to 75% and a depth of less than about 40 cm;

heating said bed of selected hydroxide to a temperature within the range of from about 300° to 900°C and above the decomposition temperature of the selected hydroxide for a time sufficient to decompose at least a part of the selected hydroxide to form the corresponding oxide and water vapor;

withdrawing the formed water vapor by passing a carrier gas into contact with said water-permeable wall of the container to absorb the water vapor permeating therethrough; and recovering thermal energy by passing a water vapor-laden carrier gas into contact with the water-permeable wall whereby the water vapor permeates through the wall into contact with the oxide to reform the selected hydroxide and generate heat.

2. The method of claim 1 wherein the heat generated is removed from the heat storage material by said carrier gas.

3. The method of claim 1 wherein the container and bed of heat storage material are located in the focal zone of a focusing solar energy collector for heating the bed of selected hydroxide with solar energy.

4. The method of claim 3 wherein said bed has a depth of from about 1 to 10 cm.

5. The method of claim 4 wherein said heat storage material is magnesium hydroxide.

6. The method of claim 1 wherein the carrier gas is withdrawn from a reservoir prior to contacting the water-permeable wall of the container to absorb the water vapor permeating therethrough and subsequently is cooled and returned to the reservoir providing a closed loop system.

7. The method of claim 1 wherein there are two water-permeable walls within said container and the bed of heat storage material is confined intermediate the two walls.

8. The method of claim 7 wherein the carrier gas passes through both the water-permeable walls and the bed of heat storage material.

9. The method of claim 8 wherein the selected hydroxide is calcium hydroxide.

10. The method of claim 1 wherein the carrier gas is steam.

* * * * *